March 24, 1925.

R. J. WINSOR

GRADER ATTACHMENT FOR TRACTORS

Filed Sept. 1, 1921

Inventor
Roy J. Winsor

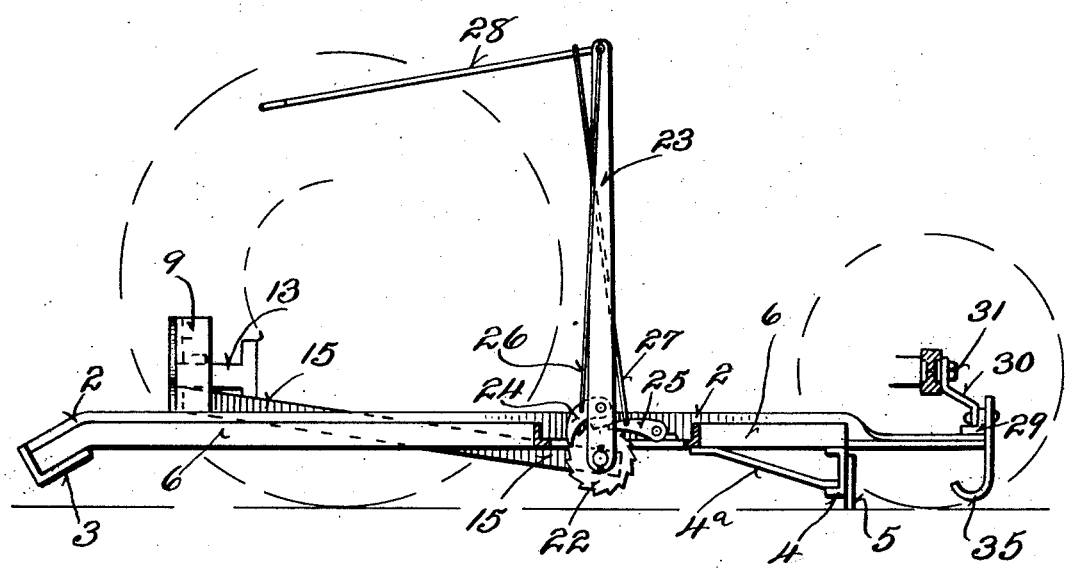
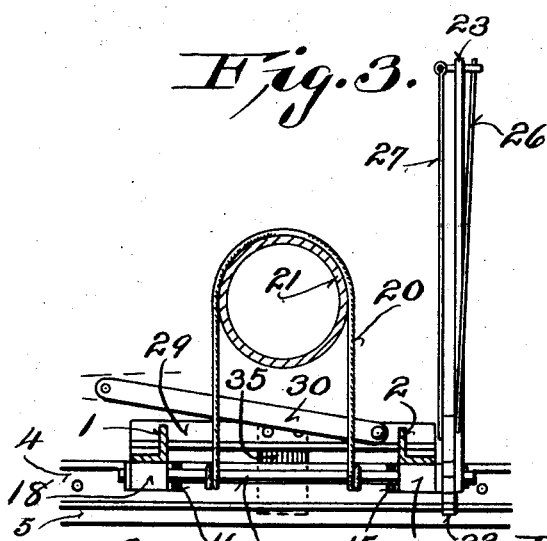
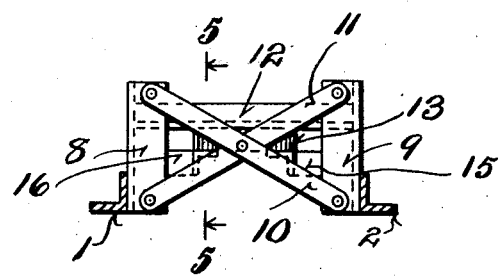
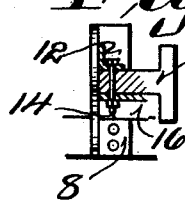

Patented Mar. 24, 1925.

1,530,534

UNITED STATES PATENT OFFICE.

ROY J. WINSOR, OF PETOSKEY, MICHIGAN, ASSIGNOR TO WEHR COMPANY, OF MILWAUKEE, WISCONSIN, A CORPORATION OF WISCONSIN.

GRADER ATTACHMENT FOR TRACTORS.

Application filed September 1, 1921. Serial No. 497,471.

*To all whom it may concern:*

Be it known that I, ROY J. WINSOR, a citizen of the United States, and resident of Petoskey, in the county of Emmet and State of Michigan, have invented certain new and useful Improvements in Grader Attachments for Tractors; and I do hereby declare that the following is a full, clear, and exact description thereof.

My invention relates to new and improved grader attachment for tractors which may be readily adapted for detachable connection with any type of tractor now on the market, and is more especially designed for smoothing and grading roads which have become filled with ruts and other irregularities.

These tractors usually have a draw bar cap at the rear end which is designed to be attached to any of the implements which are to be drawn thereby.

One of the objects of the present invention is to provide a device which may be attached to the draw bar cap with the cutting blade or scraper disposed in front thereof, and in floating relation to the ground whereby the draft of the tractor is delivered thereto in a downwardly and forwardly directed thrust.

A further object is to provide a simple and inexpensive grading device of this nature which will operate automatically to grade the surface of the road and leave it in a smooth and uniform condition.

The invention consists further in certain details of construction and combinations of parts which will be more fully set forth hereinafter and subsequently claimed.

My invention will be described in connection with the accompanying drawings in which, Figure 1 is a plan view of my invention as attached to a tractor, the latter being shown in outline.

Figure 2 is a side elevational view with parts broken away.

Figure 3 is a transverse sectional view on the line 3—3 of Figure 1.

Figure 4 is a transverse sectional view on the line 4—4 of Figure 1, and

Figure 5 is a sectional detail view on the line 5—5 of Figure 4.

Figure 1:
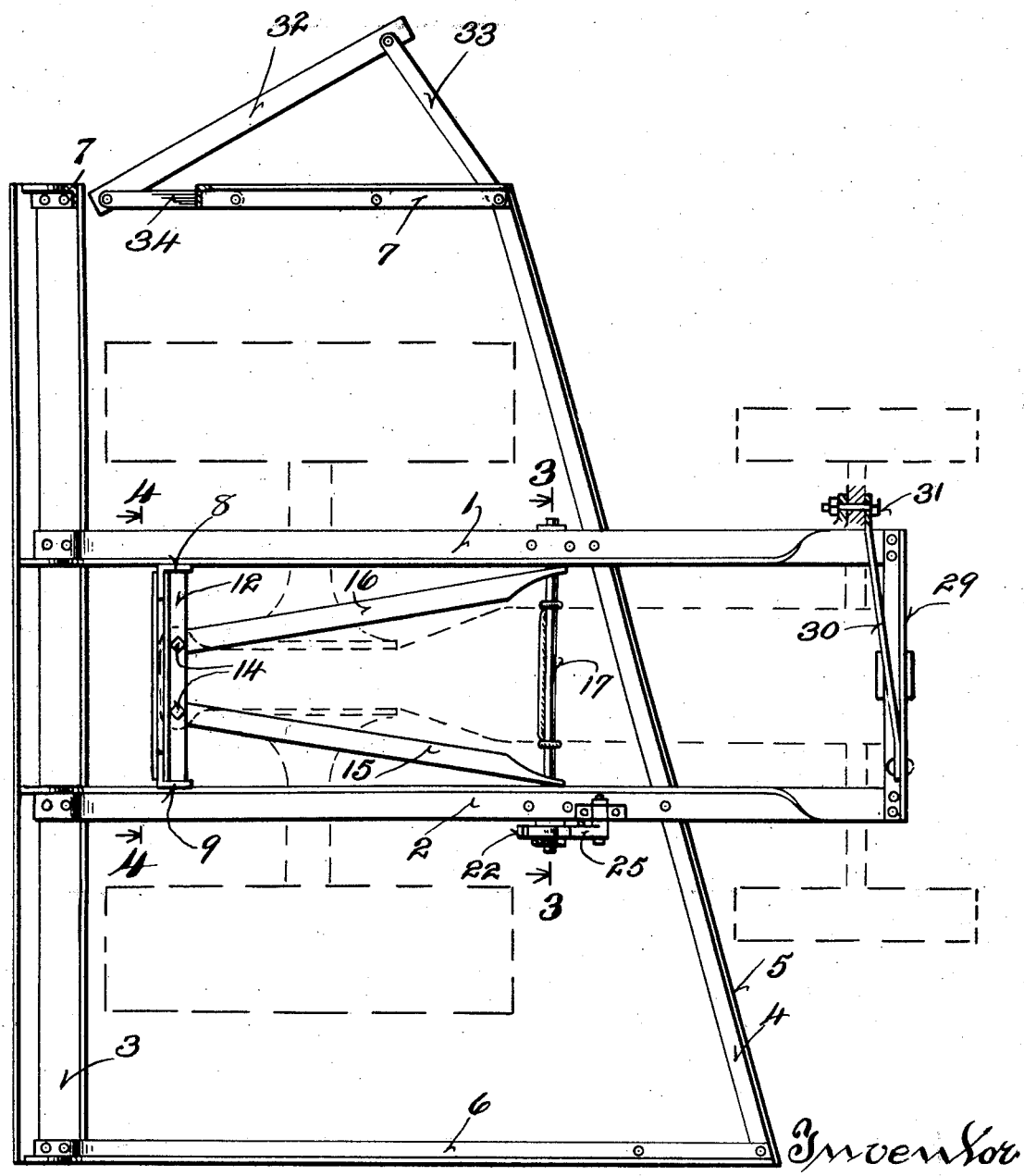

Referring specifically to the drawings, the invention comprises a pair of longitudinal frame members 1 and 2 which are connected at their rear ends by a transverse bar 3 which constitutes a smoothing member. A bar 4 extends transversely across the members 1 and 2 somewhat forward of their middle portions and carries a cutting blade or scraper 5. This member 4 is disposed obliquely so that the material which is scraped up by the scraper will be carried towards one side and delivered over the end thereof. Braces 6 and 7 connect the outer ends of the members 3 and 4. This frame which is thus rigidly braced, is provided with two vertical guides 8 and 9, which are rigidly connected by the cross braces 10 and 11 and constitute a guideway which guides the frame as it moves up and down on the transverse bar 12, the latter being secured to the draw bar cap 13 of the tractor.

Forwardly diverging arms 15 and 16 are secured at their rear ends by the bolts 14, or the like, to the bar 12 or the draw bar cap in a manner to permit a slight vertical play. A pivot rod 17 is rotatably mounted in the forward ends of the arms 15 and 16, and also journaled at 18 and 19 to the longitudinally extending bars 1 and 2. This permits the frame of the grader to rock about the pivot rod 17 as the grader is drawn over the surface of the ground and thus results in what may be termed a floating engagement with the ground.

Provision is made for adjusting the pivot rod 17 vertically so as to regulate the contact of the grader with the surface of the ground according to the character of the surface to be graded. In order to effect this vertical adjustment the rod 17 is suspended by a cord or cable 20 from the frame 21 of the device and the ends of the cable are secured to the pivot rod and a rotation of the latter will wind the cable around itself to raise the frame to the extent desired. The means for rotating the pivot rod includes a ratchet 22 secured to the end of the rod and a lever 23. Pawls 24 and 25 are provided for engaging the ratchet wheel to rotate the same and to lock the same in the position to which it has been adjusted. Links 26 and 27 are provided for operating the pawls and are connected with a supplemental lever 28 which extends to a point within reach of the driver of the tractor.

The bar 4 which carries the scraper blade 5 may be suitably braced, as at 4ª, to adapt the same to heavy work. The frame of the grader is also provided at its forward end with additional means to hold the same against lateral displacement. This means comprises a link 30 which is connected at one end to the front transverse bar 29 which is secured to the forwardly extended bars 1 and 2 and the link 30 is connected at its other end as at 31 to the axle or some other part of the frame of the tractor.

In grading a road which is badly cut up, it is usually necessary to loosen a considerable amount of the surface and the material thus loosened will be carried laterally by the scraper 5 and be delivered at the rear end thereof in a ridge or furrow. In order to smooth down this ridge and distribute the same uniformly over the surface of the road, a distributing bar 32 is provided at one side of the main frame of the grader and connected to the side bar 7 by the links 33 and 34. The material which is delivered over the end of the scraper will therefore be thrown back by the distributing bar 32 in front of the follower or smoothing blade 3 and evenly distributed thereby.

From the foregoing description, it will be seen that the frame of the grader has a rocking connection with the pivot rod 17 and a floating contact with the ground so that the pressure of the grader upon the ground will be distributed between the scraper 5 and the smoothing bar 3. In order to prevent the blade 5 from dropping down too far in case there should be an unusual depression in the surface of the ground at that point, a shoe 35 is provided which extends downwardly from the front bar 29 and normally extends to a point a slight distance above the surface of the ground. In case the blade 5 has a tendency to drop down too far, the shoe 35 will engage the surface of the ground and prevent it.

I claim as my invention:

1. A grader attachment for tractors comprising a rectangular frame with a scraper extending across the front and a smoothing blade extending across the rear thereof, arms having at one end a pivotal connection with the frame and means for attaching the other ends of the arms to a tractor so as to dispose the scraper between the front and rear wheels thereof, and a smoothing blade in rear of the rear wheels, and side members joining the outer edges of said scraper and smoothing blade and located beyond the extreme side portions of the tractor.

2. The combination with a tractor, of a pivot rod suspended from an intermediate portion of the tractor and operatively coupled thereto, a grader appliance mounted on the pivot rod and having a floating contact with the ground, and means connected with the front and rear portions of the tractor to guide the front and rear portions of the grader against lateral movement.

3. The combination with a tractor having a draw pin cap at its rear end of a pair of arms extending forwardly from the draw pin cap, a pivot journalled in the forward ends of said arms and adjustably suspended from an intermediate portion of the tractor and a grader appliance intermediately pivoted to said pivot rod.

4. The combination with a tractor of a transverse pivot rod adjustably suspended from an intermediate portion of the tractor and operatively coupled thereto, a grader appliance journalled on the pivot rod, a vertically slidable connection between the rear portions of the grader and tractor, and a transversely extending link connection between the front end of the grader and the tractor to allow a floating contact with the ground but preventing lateral displacement.

5. A grader attachment having an intermediate pivotal support, a transversely inclined scraper extending across the front thereof, a smoothing blade extending across the rear at right angles to the longitudinal center line of said attachment, and a distributing bar located laterally and to the rear of the rearward end of the scraper and extending rearwardly and inwardly to a point in front of the smoothing blade.

6. The combination of a tractor having front and rear wheels and a pin cap at its rear, and a substantially rectangular frame comprising a scraper bar positioned between the front and rear wheels of said tractor and angularly disposed with reference to the center line thereof, a smoothing bar positioned rearwardly of the rear wheels of the tractor, framework joining said bars, and forwardly extending bars joined to said pin cap at their rear ends and pivotally joined to said frame at their forward ends at a point on said framework between said front and rear wheels of the tractor.

7. The combination with a tractor having a pin cap at its rear, a road working device comprising a frame having means for operating upon the roadway, and a thrust bar pivoted to said frame intermediate the ends of said frame and extending upwardly and rearwardly to said pin cap and operatively connected thereto, whereby thrust is imparted from said pin cap to said frame in a forwardly and downwardly extending direction.

8. The combination with a tractor having a rear pin cap, of a road working device comprising a frame provided with means for operating upon a roadway, a thrust bar extending from said pin cap downwardly and forwardly to an intermediate portion of said frame and pivoted to said frame at such intermediate portion and operatively coupled to said pin cap at the rear upper end of said thrust bar, and means for supporting said frame from said tractor, said means being operatively coupled to said frame adjacent the intermediate pivotal connection between said thrust bar and said frame, whereby a forwardly and downwardly extending thrust is imparted to said frame from said pin cap, and whereby a full floating suspension of said frame is secured.

9. The combination with a tractor provided with a rear pin cap and a front axle, of a road working device comprising a frame having means for operating upon a roadway, a thrust bar connecting said frame and said rear pin cap, and attached to said frame intermediate the ends of said frame, and means connecting the front portion of said frame with said front axle to prevent lateral motion, said means permitting free vertical motion of said front end.

10. The combination with a tractor having a rear pin cap and a front axle, of a road working device comprising a frame having road working instrumentalities thereon, a thrust bar extending from said pin cap to an intermediate portion of said frame and a link joining a forward lateral portion of said frame with the opposite side of said front axle.

11. The combination of a tractor having front and rear wheels, a front axle, and a rear draw bar cap, a grader attachment comprising a rectangular frame located between said front wheels and between said rear wheels, a link pivotally joining one side of the front of said frame with the opposite side of said front axle, a pair of bars pivotally joined to said draw bar cap and pivotally joined to an intermediate portion of said frames located forwardly of said draw bar cap, means for slidably joining said draw bar cap with the rear portion of said frame, a scraper carried by said frame between said front and rear wheels, a smoothing bar carried by said frame rearwardly of said rear wheels, said scraper and said smoothing bar extending laterally beyond the rear wheels, and braces located laterally beyond the rear wheels and joining the outer ends of said scraper to the outer ends of said smoothing bar.

In testimony that I claim the foregoing I have hereunto set my hand at Milwaukee in the county of Milwaukee and State of Wisconsin.

ROY J. WINSOR.